US008620009B2

(12) United States Patent
Zhang et al.

(10) Patent No.: US 8,620,009 B2
(45) Date of Patent: Dec. 31, 2013

(54) VIRTUAL SOUND SOURCE POSITIONING

(75) Inventors: Zhengyou Zhang, Bellevue, WA (US); James D. Johnston, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1188 days.

(21) Appl. No.: 12/140,283

(22) Filed: Jun. 17, 2008

(65) Prior Publication Data

US 2009/0310802 A1 Dec. 17, 2009

(51) Int. Cl.
*H04R 5/02* (2006.01)
*H04R 5/00* (2006.01)
*H04B 1/00* (2006.01)

(52) U.S. Cl.
USPC ................................ 381/300; 381/17; 381/86

(58) Field of Classification Search
USPC ........... 381/300, 309, 310, 307, 1, 17, 18, 89, 381/86; 379/93.21, 158, 202.01; 370/260; 348/14.01–14.09
See application file for complete search history.

(56) References Cited

U.S. PATENT DOCUMENTS 6,041,127 A * 3/2000 Elko ............................... 381/92
6,091,894 A 7/2000 Fujita et al.
6,430,535 B1 8/2002 Spille et al.
7,113,602 B2 9/2006 Oinoue et al.
7,113,610 B1 9/2006 Chrysanthakopoulos
2006/0045295 A1 * 3/2006 Kim ............................. 381/310
2006/0126878 A1 6/2006 Takumai et al.
2006/0133628 A1 6/2006 Trivi et al.
2006/0280311 A1 12/2006 Beckinger et al.
2008/0298610 A1 * 12/2008 Virolainen et al. ........... 381/307

FOREIGN PATENT DOCUMENTS

WO 2004103025 A1 11/2004
WO 2007089131 A1 8/2007

OTHER PUBLICATIONS

"Virtual Source Imaging", Date: Mar. 3, 2008, pp. 1-2, http://www.isvr.soton.ac.uk/FDAG/VAP/html/vsi.html.
Grohn Matti "Localization of a Moving Virtual Sound Source in a Virtual Room, the Effect of a Distracting Auditory Stimulus", Proceedings of the 2002 International Conference on, Date: Jul. 2-5, 2002, pp. 1-9.
Pulkki Ville "Spatial Sound Generation and Perception by Amplitude Panning Techniques", Helsinki University of Technology Laboratory of Acoustics and Audio Signal Processing Espoo 2001, Report 62, Date: Aug. 3, 2001, 59 Pages.

* cited by examiner

*Primary Examiner* — Curtis Kuntz
*Assistant Examiner* — Sunita Joshi
(74) *Attorney, Agent, or Firm* — Microsoft Corporation

(57) ABSTRACT

Systems and methods for determining a virtual sound source position by determining an output for loudspeakers by the position of the loudspeakers in relation to a listener. The output of respective loudspeakers is generated using aural cues to give the listener knowledge of the virtual position of the virtual sound source. Both a gain in intensity and a delay are simulated.

20 Claims, 5 Drawing Sheets

VIRTUAL SOUND SOURCE POSITIONING

BACKGROUND

When experiencing a virtual environment graphically and audibly, a participant is often represented in the virtual environment by a virtual object. A virtual sound source produces sound that varies realistically as movement between the virtual sound source and the virtual object occurs. The person participating in the virtual environment hears sound corresponding to the sound that would be heard by the virtual object representing the person in the virtual environment. In attempting to achieve this goal, one or more signals associated with a simulated signal source may output through one or more stationary output devices.

Sound associated with a simulated sound source in a computer simulation is played through one or more stationary speakers. Because the speakers are stationary relative to the participant in the virtual environment, they do not always accurately reflect a location of the simulated sound source, particularly when there is relative movement between the virtual sound source and the virtual object representing the participant.

Accurate spatial location of the simulated sound source provides a realistic interpretation of a virtual environment, for example. This spatial location (e.g., position) of a simulated sound source is a function of direction, distance, and velocity of the simulated sound source relative to a listener represented by the virtual object. Independent sound signals from sufficiently separated fixed speakers around the listener can provide some coarse spatial location, depending on a listener's location relative to each of the speakers. However, other audio cues or binaural cues (e.g., relating to two ears) can be employed to indicate position and motion of the simulated sound source. For example, one such audio cue may be the result of a difference in the times at which sounds from the speakers arrive at a listener's left and right ears, which provides an indication of the direction of the sound source relative to the listener. This characteristic is sometimes referred to as an inter-aural time difference (ITD). Another audio cue relates to the relative amplitudes of sound reaching the listener from different sources.

There is no universally acceptable approach to guarantee accurate spatial localization with fixed speakers, even with using high-cost, complex calculations. Nevertheless, it would be beneficial to devise an alternative that provides more accurate spatial localization.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

As provided herein, a method and system for realistically simulating sounds that would be heard at the location of a virtual object such that a computer user, for example, would hear the same sound the virtual object would hear. More particularly, a virtual environment is simulated, and the results of the simulation are output through one or more loudspeakers to give an impression that sound is coming from a position of a virtual sound source even though the one or more loudspeakers are in a fixed location relative to the listener (e.g., simulating a sound perceived at a virtual location due to a virtual sound source in a virtual environment).

Methods and a system are disclosed for determining an output signal to drive physical sound sources (e.g., loudspeakers) to simulate the spatial perception of a virtual sound source by a listener in a virtual environment, based on the orientation of the listener relative to the virtual sound source. The loudspeakers track a change in the location and/or the orientation of the listener relative to the virtual sound source, so that different audio or aural cues can be updated.

The loudspeakers can be located at any place around the virtual listener. The loudspeakers can be located on a circle, such as a unit circle, that remains centered on the listener as the listener changes position and/or orientation in the virtual environment. The virtual speakers may be located at predefined locations on the circle or selectively located via a user interface. The virtual sound source can be normalized to the unit circle to simplify computations. For example, Cartesian coordinates can be used. Spherical coordinates, as well as polar coordinates may also be used.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
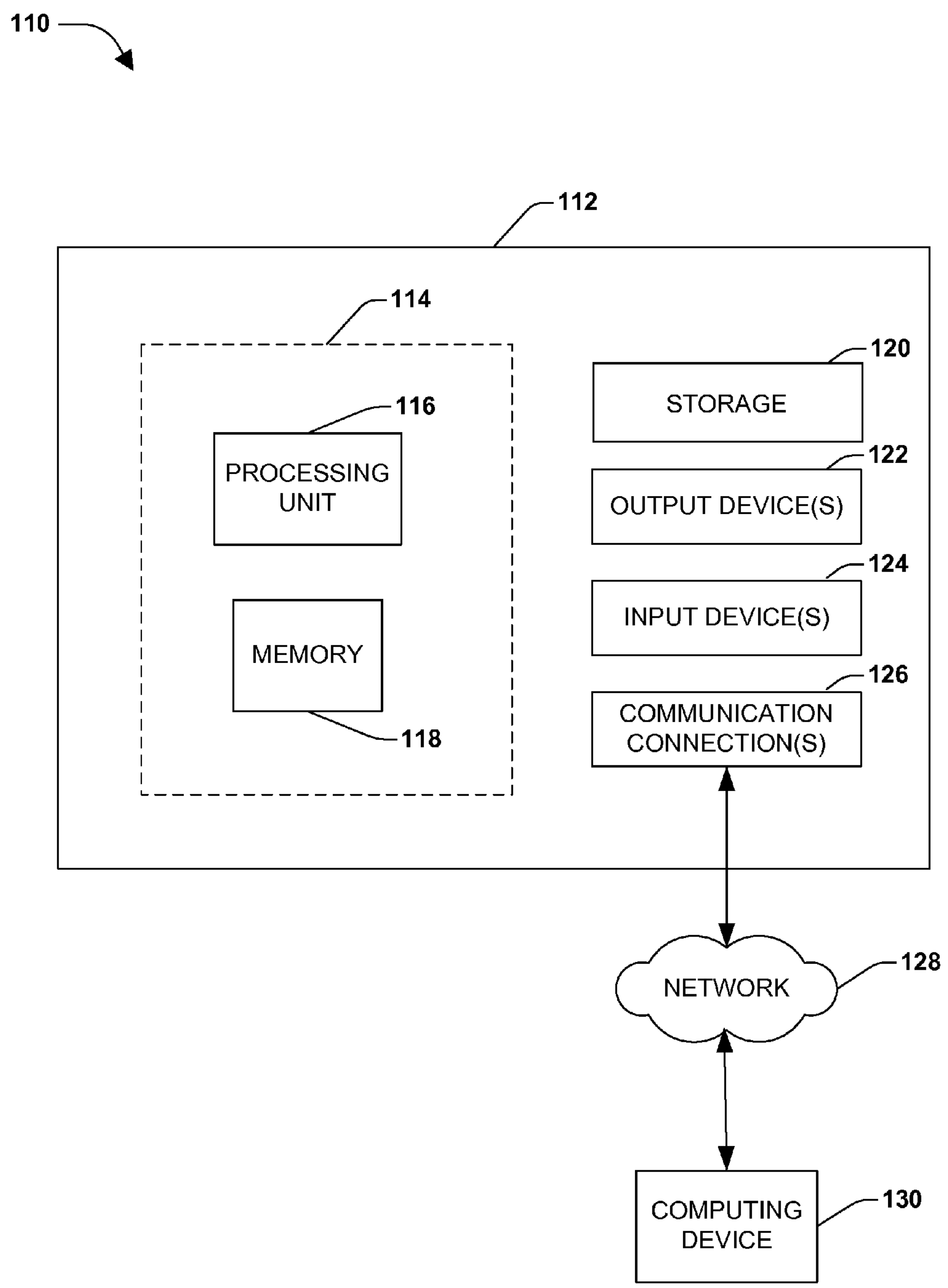
FIG. 1 illustrates an exemplary computing environment wherein one or more of the provisions set forth herein may be implemented.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Binaural cues (e.g., physically relating to two ears) can be inaccurate because the precise location of the listener is not known. For example, the listener may be very close to a speaker that produces a low volume, such that the volume from each of a plurality of surrounding speakers is perceived as substantially equivalent by the listener. Similarly, the listener's head may be orientated such that the sounds produced by each speaker may reach both ears of the listener at about the same time. These binaural cues also can become unreliable when attempting to estimate a sound's location in three-dimensional (3D) free space rather than in a two-dimensional (2D) plane, because the same IDT results at an infinite number of points along curves of equal distance from the listener's head. For example, a series of points that are equal distance from the listener's head may form a circle. The IDT at any point on this circle is the same. Thus, the listener cannot distinguish the true location of a simulated sound source that emanates from any one of the points on the circle.

There is no universally acceptable approach to guarantee accurate spatial localization with fixed speakers, even with using high-cost, complex calculations. Nevertheless, it would be beneficial to devise an alternative that provides more accurate spatial localization.

The techniques and systems, provided herein, relate to a method to realistically simulate sounds that would be heard at the location of a virtual object such that a computer user would hear the same sound the virtual object would hear. More particularly, an output signal is determined to drive physical sound sources, such as speakers, to simulate the spatial perception of a virtual sound source by a listener in a virtual environment, based on the orientation of the listener relative to the virtual sound source. Therefore, a more realistic virtual experience is achieved by improving the virtual audio experience.

FIG. 1 and the following discussion provide a brief, general description of a suitable computing environment to implement embodiments of one or more of the provisions set forth herein. The operating environment of FIG. 1 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

FIG. 1 illustrates an example of a system 110 comprising a computing device 112 configured to implement one or more embodiments provided herein. In one configuration, computing device 112 includes at least one processing unit 116 and memory 118. Depending on the exact configuration and type of computing device, memory 118 may be volatile (such as RAM, for example), non-volatile (such as ROM, flash memory, etc., for example) or some combination of the two. This configuration is illustrated in FIG. 1 by dashed line 114.

In other embodiments, device 112 may include additional features and/or functionality. For example, device 112 may also include additional storage (e.g., removable and/or non-removable) including, but not limited to, magnetic storage, optical storage, and the like. Such additional storage is illustrated in FIG. 1 by storage 120. In one embodiment, computer readable instructions to implement one or more embodiments provided herein may be in storage 120. Storage 120 may also store other computer readable instructions to implement an operating system, an application program, and the like. Computer readable instructions may be loaded in memory 118 for execution by processing unit 116, for example.

The term "computer readable media" as used herein includes computer storage media. Computer storage media includes volatile and nonvolatile, removable and non-removable media implemented in any method or technology for storage of information such as computer readable instructions or other data. Memory 118 and storage 120 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 112. Any such computer storage media may be part of device 112.

Device 112 may also include communication connection (s) 126 that allows device 112 to communicate with other devices. Communication connection(s) 126 may include, but is not limited to, a modem, a Network Interface Card (NIC), an integrated network interface, a radio frequency transmitter/receiver, an infrared port, a USB connection, or other interfaces for connecting computing device 112 to other computing devices. Communication connection(s) 126 may include a wired connection or a wireless connection. Communication connection(s) 126 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 112 may include input device(s) 124 such as keyboard, mouse, pen, voice input device, touch input device, infrared cameras, video input devices, and/or any other input device. Output device(s) 122 such as one or more displays, speakers, printers, and/or any other output device may also be included in device 112. Input device(s) 124 and output device (s) 122 may be connected to device 112 via a wired connection, wireless connection, or any combination thereof. In one embodiment, an input device or an output device from another computing device may be used as input device(s) 124 or output device(s) 122 for computing device 112.

Components of computing device 112 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 112 may be interconnected by a network. For example, memory 118 may be comprised of multiple physical memory units located in different physical locations interconnected by a network.

Those skilled in the art will realize that storage devices utilized to store computer readable instructions may be distributed across a network. For example, a computing device 130 accessible via network 128 may store computer readable instructions to implement one or more embodiments provided herein. Computing device 112 may access computing device 130 and download a part or all of the computer readable instructions for execution. Alternatively, computing device 112 may download pieces of the computer readable instructions, as needed, or some instructions may be executed at computing device 112 and some at computing device 130.

Various operations of aspects are provided herein. In one example, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Figure 2:
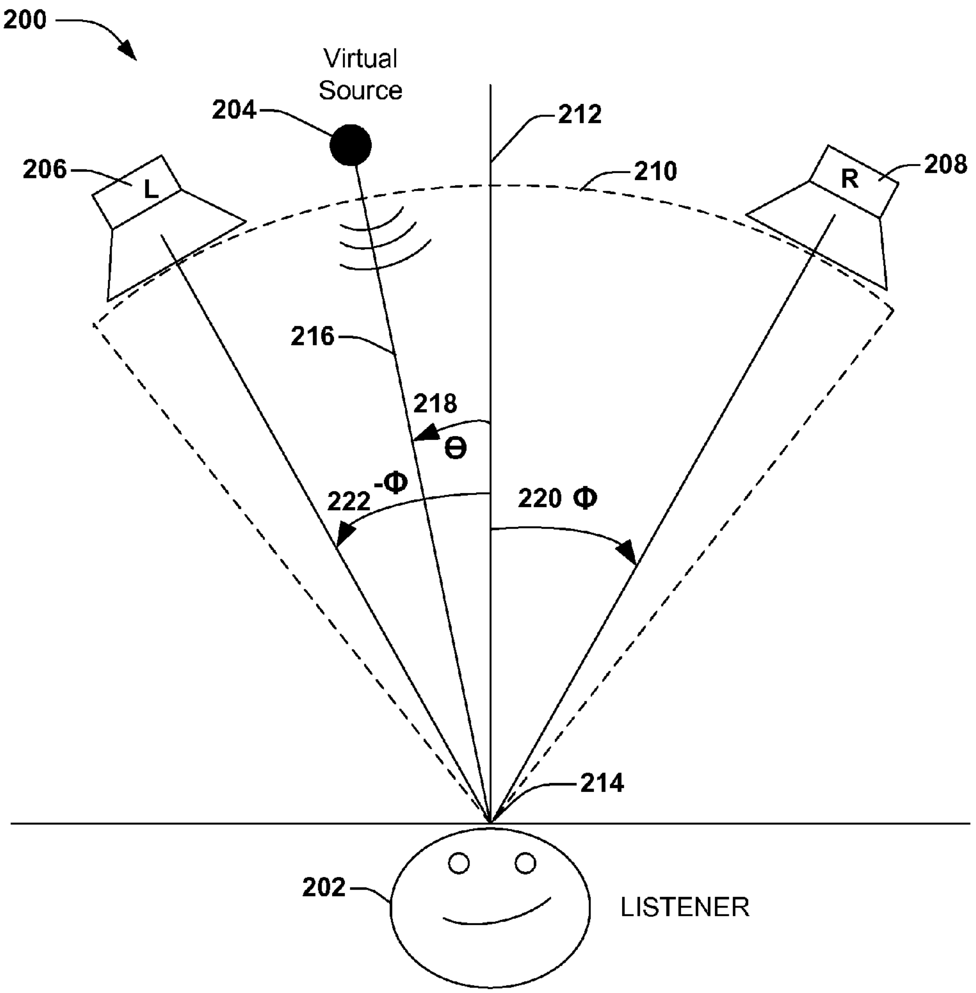
FIG. 2 is a component block diagram illustrating an exemplary system for simulating a virtual sound source position.

FIG. 2 illustrates one example of the disclosure directed to attenuating intensity and delaying time of arrival for signals output from at least two loudspeakers thereby simulating the sound perceived at a virtual sound source location due to a virtual sound source 204 in a virtual environment 200. By simulating aural (e.g., auditory) cues to the physical ear, a virtual sound source location can be simulated in the virtual environment to a listener thereby improving the virtual audio experience and resulting in an overall more realistic experience.

FIG. 2 illustrates the environment 200 and relationships between a listener 202, a virtual sound source 204, and real loudspeakers 206 and 208. The position of listener 202 may change within and relative to the environment, however, for purposes of the disclosure, listener 202 may be considered to remain at a local origin of a circle 210. In other words, circle 210 can be centered at 212 on listener 202, although circle 210 and listener 202 may move about within the environment, relative to an origin 214 of the environment. Listener 202 may be oriented to face in any 3D direction relative to the origin 214 of circle 210. Virtual sound source 204 is positioned at an angle θ 218 from center 212 of listener 202. In addition, an angle ϕ220 and an angle −ϕ222 illustrate a location of respective loudspeakers relative to center 212 of listener 202.

The virtual sound source can be used in one aspect to adjust two loudspeakers or more than two loudspeakers. The effect of the audio virtual sound source can be simulated by virtual software at the angle theta θ 218. Because sound reaches one side of a listener's head before it does the other side, the same can be simulated in a virtual environment.

In one example, the sound, such as the virtual sound source 204, can reach the left ear sooner than the right, for example. This effect gives the listener an aural cue as to the position of the sound source. Therefore, by simulating the same effect an impression can be created that sound is coming from the position of the virtual sound source 204 even though loudspeakers may be in a fixed location relative to the listener.

In one example, a gain of intensity can be simulated in a similar manner occurring with physical auditory systems in the biological ear. Sound reaching physical ears at an angle reaches one ear sooner than the other and is also heard at different intensity levels depending on the angle. Therefore, an intensity gain can also be used in software to simulate the location of a virtual sound source 204 by varying the gain of intensity at one loudspeaker as compared to other loudspeakers.

Virtual sound source 204 may be located at any position within the virtual environment. However, a virtual sound source vector 216 is normalized to define a corresponding local position of virtual sound source 204 on circle 210. Virtual sound source 204 may be a stationary or moving source of sound, such as another character or other sound-producing object in the virtual environment.

Also located on circle 210 are loudspeakers 206 and 208. Those skilled in the art will recognize that any number of physical speakers may be used. Speakers 206 and 208 may be selectively positioned anywhere on circle 210. The positions of speakers 206 and 208 can be spaced apart or positioned around a physical listener, such as a participant in the computer game or virtual simulation.

In one aspect, signals from the loudspeakers can be adjusted as if the virtual sound source 204 is located for example at the virtual sound source 204 in FIG. 2. In this particular example, the left loudspeaker can detect the sound earlier as the sound waves emanate across space from the virtual sound source 204. For example, as a song is sung from the same position it would first be heard by the left loudspeaker and then within a few milliseconds the right loudspeaker. By adjusting loudspeakers to imitate the delays and the gains obtained from a particular situation, as if the virtual sound source 204 was actual at the angle theta 218, properties of the human auditory system can be used to filter out information overload causing confusion and the same effect be reproduced.

Figure 3:
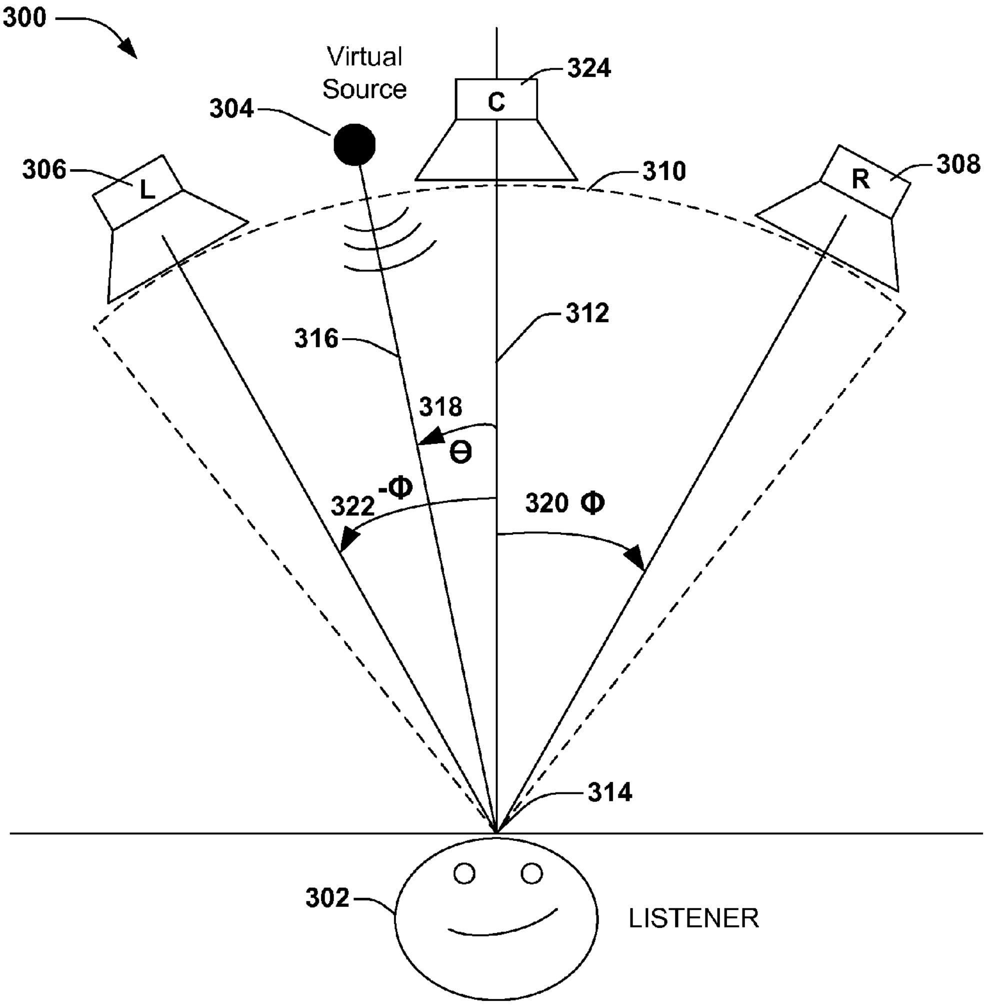
FIG. 3 is a component block diagram illustrating an exemplary system for simulating a virtual sound source position.

FIG. 3 illustrates an environment 300 and relationships between a listener 302, a virtual sound source 304, and three loudspeakers comprising a left loudspeaker 306, a right loudspeaker 308, and a center loudspeaker 324. Even though three loudspeakers are depicted the disclosure is not limited to just three loudspeakers may comprise more than three loudspeakers for simulating a virtual sound source location. A circle 310 is centered at 312 on listener 302. Virtual sound source 304 is positioned at an angle θ318 from center 312 of listener 302. In addition, an angle ϕ320 and an angle −ϕ322 illustrate a location of respective loudspeakers relative to center 312 of listener 302.

Virtual sound source 304 may be located at any position within the environment. However, a virtual sound source vector 316 is normalized to define a corresponding local position of virtual sound source 304 on circle 310. Virtual sound source 304 may be a stationary or moving source of sound, such as another character or other sound-producing object in the virtual environment.

Also located on unit circle 310 are speakers 306, 308, and 324. Those skilled in the art will recognize that any number of speakers may be used. Speakers 306, 308 and 324 may be selectively positioned anywhere on unit circle 310 around a physical listener, such as a participant in the computer game or virtual simulation for example.

Figure 4:
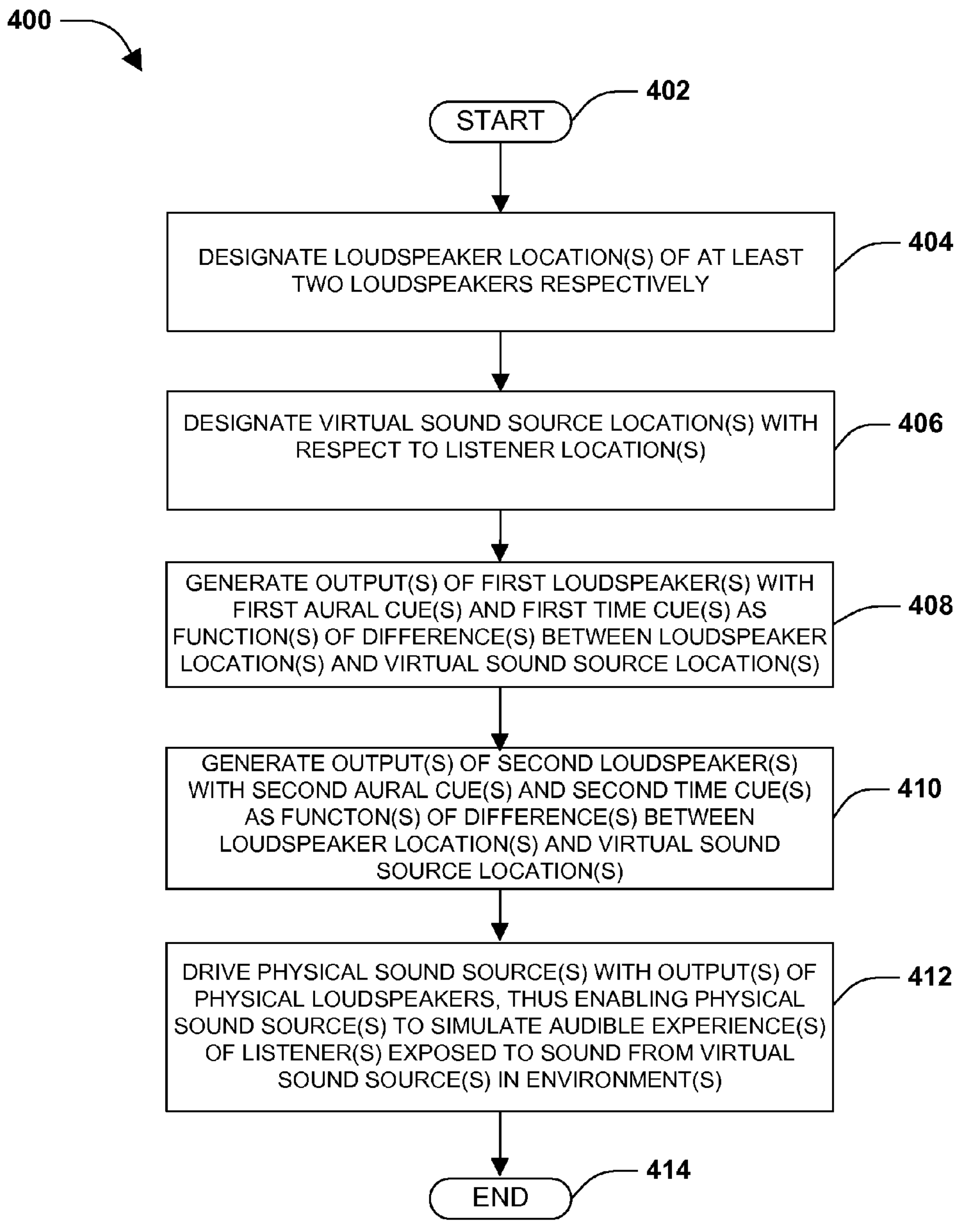
FIG. 4 is a flow chart illustrating an exemplary method of simulating a virtual sound source position.

FIG. 4 illustrates one embodiment of a method 400 for determining an output of at least two loudspeakers to simulate a virtual position of a virtual sound source in an environment. The method 400 starts at 402. A loudspeaker location of at least two loudspeakers is respectfully designated with respect to a listener location at 404.

In one example a first loudspeaker is designated as a left loudspeaker and a second loudspeaker is designated as a right loudspeaker. Other loudspeakers may also be embodied as one of ordinary skill in the art would recognize. The first loudspeaker and the second loudspeaker are positioned in relation to a listener location where the listener location is designated as the center between the two loudspeakers. Each respective loudspeaker is therefore an angle, ϕ for example, away from center of the plane in line with the listener. Consequently, the left loudspeaker, for example, may be at a location of angle negative phi (−ϕ) with respect to a listener location and the right loudspeaker at an angle positive phi (+ϕ).

A virtual sound source location is designated 406 in relation to the center plane of the listener. The listener can be a virtual listener, but may also be a physical listener among physical speakers as well. After relative locations are designated an output is generated with aural cues in order to simulate physical sound location from a virtual environment. Complex calculations can be used to simulate the sound location, however one embodiment of the disclosure uses auditory cues, such as time cues and intensity cues, to simulate the actual sensation of sound from a location being received by a head of a person at two different locations, namely a right ear and a left ear. Depending on the location of the sound source the intensity will be felt by one ear to a greater or lesser degree than the other, sometimes as much as 20 db. In addition, a delay results because sound travels around physical objects, such as a person's head, and consequently arriving at one ear with a delay as compared to the other ear.

At 408 an output is generated at a first loudspeaker with a first aural cue and additionally with a first time cue. The first aural cue can be an intensity gain or loudness gain factor to increase or decrease the first loudspeaker accordingly. The first time cue corresponding to the first loudspeaker is a factor for increasing the final sample wave propagated by a delay factor. The first aural cue and the first time cue are computed as a function of a difference between the loudspeaker location and the virtual sound source location.

Auditory or aural cues are how organisms become aware of the relative positions of their own bodies and objects around them. Space perception, for example, provides cues, such as depth and distance that are for movement and orientation to the environment. Taking advantage of such natural perception indicators such as aural cues can aid in the simulation of a virtual sound source position.

At 410 an output of a second loudspeaker is generated with a second aural cue and a second time cue as a function of a difference between the loudspeaker location and the virtual sound source location. The second aural cue can be an intensity gain or loudness gain factor to increase or decrease the second loudspeaker accordingly.

At 412 a physical sound source drives the output of loudspeakers to enable a simulation of an audible experience of a listener exposed to sound from the virtual sound source in the environment. In this way, a listener operating within the environment experiences the virtual sound source location as if actually in the environment through, for example, speakers of a game system.

The first aural cue and second aural cue in a two loudspeaker system are generated to affect the signal of a virtual sound source by a factor of an intensity gain. Additional speakers may also be embodied. In one embodiment, the intensity gain is calculated in accord with an equation as follows:

$$G=\cos((\phi\pm\theta)\pi/4\phi),$$

where G represents the intensity gain factor, $\theta$ represents an angle of the virtual sound source with respect to the listener, and $\phi$ represents an angle of the first loudspeaker or the second loudspeaker with respect to the listener.

By the previous equation an output of the first loudspeaker and an output of a second loudspeaker are affected by a gain of intensity as a function of a difference between the loudspeaker location and the virtual sound source location. The locations of the loudspeaker and the virtual sound source are determined by the angular locations in relation to the center plane of the listener, as illustrated in FIG. 3, for example.

In one example, the right speaker is located at angle $\phi$, the left loudspeaker is located at angle $-\phi$, and the desired virtual sound source is positioned at angle $\theta$. Then, given an audio signal, it is played with a gain on the right loudspeaker $G_R=\cos((\phi-\theta)\pi/4\phi)$, and it is played at the left loudspeaker with a gain $G_L=\cos((\phi+\theta)\pi/4\phi)$.

The first time cue and the second time cue are generated to affect the output signal of a virtual sound source by a delay. In one aspect, the delay is calculated in accord with an equation as follows:

$$\Delta=D-D\cos((\phi\pm\theta)\lambda),$$

where $\Delta$ represents the delay, D is approximately 0.45 milliseconds, $\lambda$ represents a number equal to or greater than 1 or approximately $\pi/(2\phi)$, $\theta$ represents an angle of the virtual sound source with respect to the listener, and $\phi$ represents an angle of the first loudspeaker or the second loudspeaker with respect to the listener.

By the previous equation an output of the first loudspeaker and an output of a second loudspeaker are affected by a delay as a function of a difference between the loudspeaker location and the virtual sound source location. The locations of the loudspeaker and the virtual sound source are determined by the angular locations in relation to the center plane of the listener, as illustrated in FIG. 3, for example.

In one example, the right speaker is located at angle $\phi$, the left loudspeaker is located at angle $-\phi$, and the desired virtual sound source is positioned at angle $\theta$. Then, given an audio signal, it is played at the right speaker with a delay $\Delta_R=D-D\cos((\phi-\theta)\lambda)$, and it is played at the left loudspeaker with a delay $\Delta_L=D-D\cos((\phi+\theta)\lambda)$.

In another example, the first time cue and/or the second time cue may be a delay in the respective loudspeaker by a number of samples comprising a difference in a delay between the first loudspeaker and the second loudspeaker, multiplied by a sampling rate. The delay is the amount of time each signal of a loudspeaker reaches the listener. The sampling rate is the rate at which the sound is sampled in which to simulate for the virtual environment.

In one embodiment, a virtual sound source can be positioned with three loudspeakers although more than three loudspeakers can be used. An example of three loudspeakers is discussed as a further example. The three loudspeakers can have a left loudspeaker, a central loudspeaker and/or a right loudspeaker, for example. The right loudspeaker can be positioned at angle $\phi$, the left loudspeaker can be positioned at the angle $-\phi$, and the virtual sound source can be positioned at angle $\theta$. The central loudspeaker can be positioned anywhere at center or located anywhere else surrounding a listener that is not necessarily center.

In one example, the delay and the gain for respective loudspeakers is calculated as if the sound were captured by a corresponding hypercardioid microphone. A hypercardioid microphone is one where the directionality or polar pattern is of a hypercardioid shape indicating how sensitive it is to sounds arriving at those angles about its central axis. In addition, other microphone patterns may also be embodied.

A hypercardioid microphone of first order approximation displays a directional pattern by $G=\alpha+(1-\alpha)\cos(\theta)$. Therefore, in one aspect the formula for the delay cues and gain cues of the audio signals to be played at respective loudspeakers are as follows:

$$\Delta_R=D-D\cos(\phi-\theta),$$

$$\Delta_C=D-D\cos(\theta),$$

$$\Delta_L=D-D\cos(\phi+\theta),$$

$$G_R=\alpha+(1-\alpha)\cos(\phi-\theta),$$

$$G_C=\alpha+(1-\alpha)\cos(\theta),$$

$$G_L=\alpha+(1-\alpha)\cos(\phi+\theta).$$

A reasonable value for D is approximately 0.45 milliseconds. The value of $\alpha$ can be determined by positioning the virtual sounds at either the right loudspeaker or left loudspeaker, for example. Because when the virtual sound is positioned at the left or right loudspeaker no sound is expected to come from the right loudspeaker or left loudspeaker respectively, $\alpha+(1-\alpha)\cos(2\phi)$ can be set to zero to determined $\alpha$. For example, $\phi=2\pi/5$ (or 72 degrees), $\alpha=0.4472$.

Figure 5:
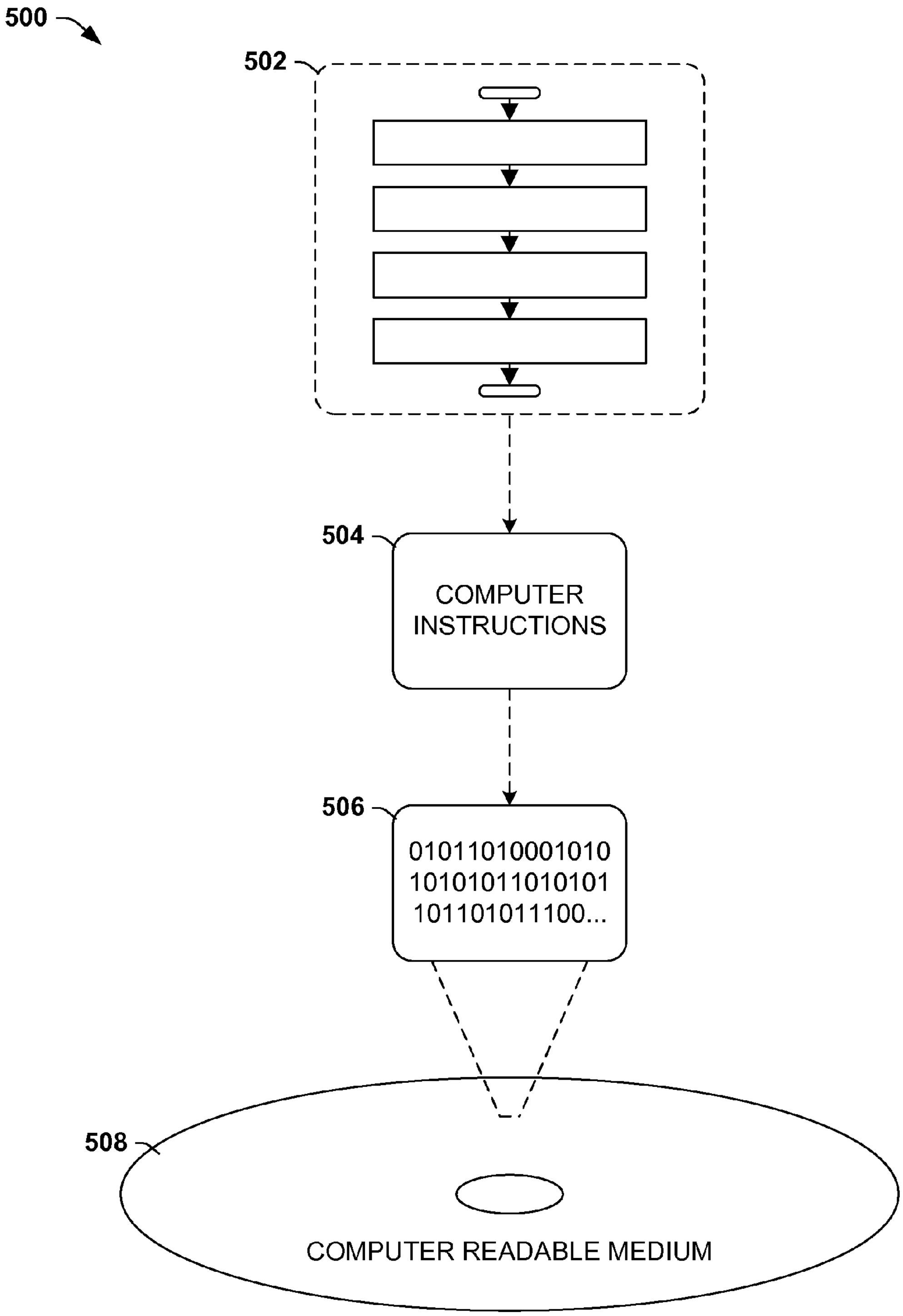
FIG. 5 is an illustration of an exemplary computer-readable medium comprising processor-executable instructions configured to embody one or more of the provisions set forth herein.

Still another embodiment involves a computer-readable medium comprising processor-executable instructions configured to implement one or more of the techniques presented herein. An exemplary computer-readable medium that may be devised in these ways is illustrated in FIG. 5, wherein the implementation 500 comprises a computer-readable medium 508 (e.g., a CD-R, DVD-R, or a platter of a hard disk drive), on which is encoded computer-readable data 506. This computer-readable data 506 in turn comprises a set of computer instructions 504 configured to operate according to one or more of the principles set forth herein.

In one such embodiment, for example implementation 500, the processor-executable instructions 504 may be configured to perform a method 502, such as the exemplary method 400 of FIG. 4, for example. In another such embodiment, the processor-executable instructions 504 may be configured to implement a system, such as the exemplary virtual environment 300 of FIG. 3, for example. Many such computer-readable media may be devised by those of ordinary skill in the art that are configured to operate in accordance with the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method for determining an output of at least two loudspeakers comprising:

designating a first loudspeaker location for a first loudspeaker with respect to a location of a listener;

designating a second loudspeaker location for a second loudspeaker with respect to the location of the listener;

designating a virtual sound source location for a virtual sound source within a virtual environment with respect to a virtual location of the listener within the virtual environment;

determining an output for the first loudspeaker based upon the designated first loudspeaker location and the designated virtual sound source location, comprising:

determining an intensity of one or more sounds to be emitted from the first loudspeaker comprising determining a gain of intensity according to $G=\cos((\phi\pm\theta)\pi/4\phi)$, G representing the gain of intensity, $\phi$ representing a first offset angle of the first loudspeaker relative to the listener, and $\theta$ representing an offset angle of the virtual sound source relative to the virtual location of the listener; and determining an output for the second loudspeaker based upon the designated second loudspeaker location and the designated virtual sound source location.

2. The method of claim 1, designating the first loudspeaker location comprising:

defining the first offset angle.

3. The method of claim 2, designating the second loudspeaker location comprising:

defining a second offset angle for the second loudspeaker relative to the listener.

4. The method of claim 3, the second offset angle an additive inverse of the first offset angle.

5. The method of claim 1, determining the output for the first loudspeaker comprising:

determining a time-delay for emitting, from the first loudspeaker, one or more sounds corresponding to a sound emitted from a source represented by the virtual sound source.

6. The method of claim 5, determining the time-delay comprising:

determining the time-delay according to $\Delta = D - D\cos((\phi \pm \theta)\lambda)$, $\Delta$ representing the time-delay, D representing a specified time, and $\lambda$ representing approximately $\pi/(2\phi)$.

7. The method of claim 1, comprising:

designating a third loudspeaker location for a third loudspeaker with respect to the location of the listener; and determining an output for the third loudspeaker based upon the designated third loudspeaker location and the designated virtual sound source location.

8. The method of claim 1, determining the output for the first loudspeaker comprising:

determining a first time-delay for emitting, from the first loudspeaker, a first sound corresponding to a sound emitted from a source represented by the virtual sound source, and determining a first intensity of the first sound.

9. The method of claim 8, determining the output for the second loudspeaker comprising:

determining a second time-delay for emitting, from the second loudspeaker, a second sound corresponding to the sound emitted from the source represented by the virtual sound source, and determining a second intensity of the second sound, at least one of:

the first time-delay different than the second time-delay, or the first intensity different than the second intensity.

10. A system for determining an output of at least two loudspeakers comprising:

one or more processing units; and memory comprising instructions that when executed by at least some of the one or more processing units, perform a method comprising:

designating a first loudspeaker location for a first loudspeaker with respect to a location of a listener;

designating a second loudspeaker location for a second loudspeaker with respect to the location of the listener;

designating a virtual sound source location for a virtual sound source within a virtual environment with respect to a virtual location of the listener within the virtual environment;

determining an output for the first loudspeaker based upon the designated first loudspeaker location and the designated virtual sound source location, comprising:

determining a first time-delay for emitting, from the first loudspeaker, a first sound corresponding to a sound emitted from a source represented by the virtual sound source, and determining a first intensity of the first sound; and determining an output for the second loudspeaker based upon the designated second loudspeaker location and the designated virtual sound source location, comprising determining a second time-delay for emitting, from the second loudspeaker, a second sound corresponding to the sound emitted from the source, and determining a second intensity of the second sound, at least one of:

the first time-delay different than the second time-delay, or the first intensity different than the second intensity.

11. The system of claim 10, designating the first loudspeaker location comprising:

defining a first offset angle for the first loudspeaker relative to the listener.

12. The system of claim 11, designating the second loudspeaker location comprising:

defining a second offset angle for the second loudspeaker relative to the listener, the second offset angle an additive inverse of the first offset angle.

13. The system of claim 12, designating the virtual sound source location comprising:

defining a third offset angle for the virtual sound source relative to the virtual location of the listener within the virtual environment.

14. The system of claim 10, the method comprising:

designating a third loudspeaker location for a third loudspeaker with respect to the location of the listener; and determining an output for the third loudspeaker based upon the designated third loudspeaker location and the designated virtual sound source location.

15. The system of claim 10, the determined output for the first loudspeaker different than the determined output for the second loudspeaker.

16. A tangible computer readable storage device, excluding signals comprising computer executable instructions that when executed via a processing unit perform a method for determining an output of at least two loudspeakers, the method comprising:

designating a first loudspeaker location for a first loudspeaker with respect to a location of a listener;

designating a second loudspeaker location for a second loudspeaker with respect to the location of the listener;

designating a virtual sound source location for a virtual sound source within a virtual environment with respect to a virtual location of the listener within the virtual environment;

determining an output for the first loudspeaker based upon the designated first loudspeaker location and the designated virtual sound source location; and determining an output for the second loudspeaker based upon the designated second loudspeaker location and the designated virtual sound source location, comprising least one of:

varying a second time-delay for emitting a second sound from the second loudspeaker relative to a first time-delay for emitting a first sound from the first loudspeaker, the first sound and second sound corresponding to a sound emitted from a source represented by the virtual sound source; or varying a second intensity of the second sound relative to a first intensity of the first sound.

17. The computer readable storage device of claim 16, designating the first loudspeaker location comprising:

defining a first offset angle for the first loudspeaker relative to the listener.

18. The computer readable storage device of claim 17, designating the second loudspeaker location comprising:

defining a second offset angle for the second loudspeaker relative to the listener, the second offset angle an additive inverse of the first offset angle.

19. The computer readable storage device of claim 16, the method comprising:

designating a third loudspeaker location for a third loudspeaker with respect to the location of the listener; and determining an output for the third loudspeaker based upon the designated third loudspeaker location and the designated virtual sound source location.

20. The computer readable storage device of claim 16, the method comprising:

determining the first time-delay for emitting the first sound from the first loudspeaker according to $\Delta = D - D\cos((\phi \pm \theta)\lambda)$, $\Delta$ representing the first time-delay, D representing a specified time, $\phi$ representing a first offset angle of the first loudspeaker relative to the listener, $\theta$ resenting an offset angle of the virtual sound source relative to the virtual location of the listener, and $\lambda$ representing approximately $\pi/(2\phi)$.

* * * * *